(12) United States Patent
Hills et al.

(10) Patent No.: US 11,904,353 B2
(45) Date of Patent: Feb. 20, 2024

(54) USE OF HARDENERS/DENSIFIERS IN CUTTING OR OTHERWISE REMOVING MATERIAL FROM INORGANIC SUBSTRATES

(71) Applicant: ADHESIVES TECHNOLOGY CORPORATION, Pompano Beach, FL (US)

(72) Inventors: Dal N. Hills, Midway, UT (US); Kason Hills, Midway, UT (US)

(73) Assignee: ADHESIVES TECHNOLOGY CORPORATION, Pompano Beach, FL (US)

(*) Notice: Subject to any disclaimer, the term of this patent is extended or adjusted under 35 U.S.C. 154(b) by 562 days.

(21) Appl. No.: 14/600,995

(22) Filed: Jan. 20, 2015

(65) Prior Publication Data
US 2015/0202652 A1 Jul. 23, 2015

Related U.S. Application Data

(60) Provisional application No. 61/929,483, filed on Jan. 20, 2014.

(51) Int. Cl.
| | | |
|---|---|---|
| *B05D 3/12* | (2006.01) | |
| *C04B 41/00* | (2006.01) | |
| *B28D 7/02* | (2006.01) | |
| *B24B 7/22* | (2006.01) | |
| *B24B 27/06* | (2006.01) | |
| *C04B 41/50* | (2006.01) | |

(Continued)

(52) U.S. Cl.
CPC ............... *B05D 3/12* (2013.01); *B05C 9/10* (2013.01); *B24B 7/228* (2013.01); *B24B 27/06* (2013.01); *B28D 7/02* (2013.01); *C04B 41/009* (2013.01); *C04B 41/5089* (2013.01); *C04B 41/68* (2013.01)

(58) Field of Classification Search
CPC . C04B 41/50; C04B 41/5024; C04B 41/5035; C04B 41/53
USPC .......................................................... 427/289
See application file for complete search history.

(56) References Cited

U.S. PATENT DOCUMENTS

| | | | | |
|---|---|---|---|---|
| 3,896,783 | A | * | 7/1975 | Manning ................ B23D 59/02 125/13.01 |
| 5,605,493 | A | * | 2/1997 | Donatelli .............. A47L 11/305 15/49.1 |

(Continued)

OTHER PUBLICATIONS

Persello et al. Flow of colloidal aqueous silica dispersions, J. Rheol. 38(6) Nov./Dec. 1994, pp. 1845-1870. (Year: 1994).*

(Continued)

*Primary Examiner* — Kelly M Gambetta
(74) *Attorney, Agent, or Firm* — BENESCH, FRIEDLANDER, COPLAN & ARONOFF LLP

(57) ABSTRACT

A method for cutting or otherwise removing material from an inorganic substrate (e.g., a substrate formed from a cementitious material, such as concrete, or stone, etc.) includes applying an aqueous solution that includes a hardener/densifier to the inorganic substrate and/or to a removal element (e.g., a saw blade, an abrasive wheel, a grinding disk, etc.), the inorganic substrate or material removed from the inorganic substrate as the removal element removes material from the inorganic substrate. A system for removing material from an inorganic substrate includes a removal element and an aqueous solution that includes a hardener/densifier.

11 Claims, 1 Drawing Sheet

(51) Int. Cl.
*C04B 41/68* (2006.01)
*B05C 9/10* (2006.01)

(56) References Cited

U.S. PATENT DOCUMENTS

| | | | | |
|---|---|---|---|---|
| 6,155,907 | A | * | 12/2000 | Jones ............... C04B 41/5089 404/78 |
| 7,737,195 | B2 | | 6/2010 | Gimvang |
| 8,852,334 | B1 | | 10/2014 | Hills et al. |
| 2002/0045415 | A1 | * | 4/2002 | Bath ............... B24B 55/052 451/449 |
| 2005/0153140 | A1 | * | 7/2005 | Li ............... B05D 1/36 428/423.1 |
| 2009/0000520 | A1 | | 1/2009 | Kishimoto |
| 2009/0110834 | A1 | | 4/2009 | Gimvang |
| 2012/0097907 | A1 | | 4/2012 | Bauer et al. |
| 2013/0004670 | A1 | * | 1/2013 | Hills ............... C09D 133/08 427/355 |
| 2013/0029050 | A1 | | 1/2013 | Hills et al. |
| 2014/0220867 | A1 | * | 8/2014 | Wetherell ............... C04B 41/68 451/41 |
| 2015/0202652 | A1 | | 7/2015 | Hills et al. |

OTHER PUBLICATIONS

Bjornstrom, J., et al., "Accelerating effects of colloidal nano-silica for beneficial calcium-silicate-hydrate formation in cement," Chemical Physics Letters, 392:242-248 (2004).

Green, B.H., "Development of High-Density Cementitious Rock-Matching Grout Using Nano-Particles," Proceedings of ACI Session on Nanotechnology of Concrete: Recent Developments and Future Perspectives, Nov. 7, 2006, Denver U.S.A.

United States Patent and Trademark Office, Acting as the International Search Authority, "International Search Report and Written Opinion," dated Apr. 8, 2015 in international patent application No. PCT/US2015/012084.

* cited by examiner

USE OF HARDENERS/DENSIFIERS IN CUTTING OR OTHERWISE REMOVING MATERIAL FROM INORGANIC SUBSTRATES

CROSS-REFERENCE TO RELATED APPLICATION

A claim for the benefit of priority to the Jan. 20, 2014 filing date of U.S. Provisional Patent Application No. 61/929,483, titled USE OF HARDENERS IN CUTTING OR OTHERWISE REMOVING MATERIALS FROM CEMENTITIOUS SUBSTRATES ("the '483 Provisional Application") is hereby made pursuant to 35 U.S.C. § 119(e). The entire disclosure of the '483 Provisional Application is hereby incorporated herein.

TECHNICAL FIELD

This disclosure relates generally to methods and systems for cutting or otherwise removing material from inorganic substrates, such as structures formed from concrete or other cementitious materials, or structures formed from stone. More specifically this disclosure relates to methods for cutting or otherwise removing material from inorganic substrates that include applying hardeners/densifiers to apparatuses for removing material from inorganic substrates and/or to the inorganic substrates themselves. In addition, this disclosure relates to systems that include apparatuses for cutting or otherwise removing material from inorganic substrates and lubricants that include hardeners/densifiers.

RELATED ART

A variety of apparatuses, or tools, have long been used to mechanically modify structures that are made from stone, concrete and a variety of other cementitious materials. These apparatuses include saws for cutting into and/or through structures formed from stone, concrete and other cementitious materials, grinders for altering surfaces of such structures and other tools that may be used to selectively remove material from a structure to modify the structure.

When conventional tools are used to cut into or otherwise remove material from a structure formed from stone, concrete or another cementitious material, the removal process typically generates a significant amount of dust and debris. The dust generated by mechanically modifying stone, concrete and other cementitious materials typically includes fine respirable silica (RCS) particles, which can penetrate deeply into an individual's lungs and have serious health effects, such as silicosis and lung cancer.

In an effort to reduce the spread of dust, water has been applied to the dust, to parts of the structure and/or to the tool while cutting, grinding or other mechanical modification of the structure takes place. While the use of water may reduce the spread of dust, water does not prevent dust and other debris from being forced into pores, microfissures, cracks or other recesses that are exposed as material is removed from the structure or the compression of dust and other debris against the new surfaces that are formed as material is removed from the structure. The presence of this dust or debris, which is referred to as "microcompressibles," on the surfaces of structures that are formed from stone, concrete and other cementitious materials, and in pores that communicate with the surfaces, may undesirably reduce the ability of sealants, other coating compounds and joint seals to adhere to the affected surfaces.

SUMMARY

This disclosure relates to methods and systems that employ hardener/densifiers in conjunction with mechanical modification of a structure that comprises stone, concrete or another cementitious material.

For the sake of simplicity, the term "inorganic substrate," as used in this disclosure, refers to structures that comprises or that are formed from stone, concrete or another cementitious material.

The terms "removal element" and "material removal element" include apparatuses for mechanically modifying, or removing material, from inorganic substrates. Various examples of removal elements include, but are not limited to, saw blades (e.g., diamond saw blades, etc.), abrasive wheels, grinding disks and the like. The term "removal equipment" includes equipment for driving or otherwise operating the removal element, such as a saw for operating (e.g., rotating, etc.) a saw blade, a grinder for operating a grinding disk, an abrasive disk or a saw blade and other types of removal equipment for operating other, complementary types of removal elements.

According to one aspect of this disclosure, a method for modifying an inorganic substrate includes removing material from the inorganic substrate (e.g., by cutting, grinding, etc.) while applying a hardener/densifier to one or both of the inorganic substrate and a removal element. The inorganic substrates that may be modified in accordance with this disclosure include new structures (e.g., slabs, etc.) that have been formed from a cementitious material (e.g., concrete, etc., that has not fully cured) and existing structures (e.g., stone, fully cured concrete, etc.). The hardener/densifier, which comprises a chemical or composition that hardens and/or densifies inorganic substrates, may be part of an aqueous solution. In some embodiments, the hardener/densifier may comprise a colloidal silica. In other embodiments, the hardener/densifier may comprise a lithium polysilicate. Still other embodiments of hardeners/densifiers include other alkali metal silicates, such as potassium silicate or sodium silicate.

In another aspect, systems for modifying inorganic substrates, such as concrete, other cementitious substrates, stone substrates and the like, are disclosed. Such a system may include a removal element and a hardener/densifier. Such a system may also include suitable removal equipment. In some embodiments, a system for removing material from inorganic substrates may also include one or more chemical compounds (e.g., colorants, coatings, sealants, etc.) or one or more elements to be used in conjunction with a modified inorganic substrate (e.g., seals, etc.).

Other aspects, as well as features and advantages, of the disclosed subject matter will become apparent to those of ordinary skill in the art through consideration of the ensuing description, the accompanying drawings and the appended claims.

DETAILED DESCRIPTION

Figure 1:
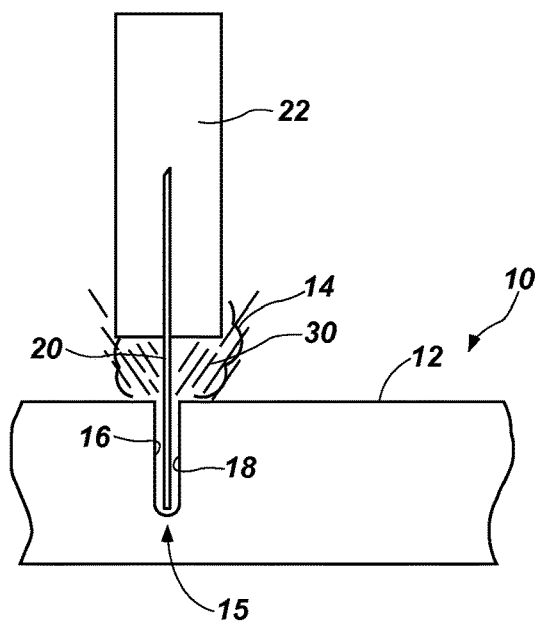
FIG. 1 illustrates an embodiment of a method for cutting into an inorganic substrate.

With reference to FIG. 1, an embodiment of a method for modifying an inorganic substrate 10 is illustrated. In the depicted embodiment, a saw blade 20, operating under control of a saw 22, is used to cut into the inorganic substrate 10. The saw blade 20 may comprise a diamond saw blade, an abrasive wheel or any other type of removal element configured to cut into an inorganic substrate. As the saw 22 operates the saw blade 20 and the saw blade 20 is brought into contact with a surface 12 of the inorganic substrate 10, the saw blade 20 begins to remove material 14 from the inorganic substrate 10, and to form two surfaces 16 and 18 in the inorganic substrate 10. These surfaces 16 and 18, which are opposed to, or face, one another, define a cut or joint 15 in the inorganic substrate 10. The material 14 that has been removed to form the cut or joint 15 includes fine dust and other debris, which may be compressed against the surfaces 16 and 18 and forced into pores, microfissures, cracks or other openings or recesses that open or extend into one or both of the surfaces 16 and 18.

While the saw blade 20 contacts the inorganic substrate 10 and removes material 14 from the inorganic substrate 10, a hardener/densifier 30 may be applied to the saw blade 20, to the cut or joint 15 and/or to the material 14 that has been removed from the inorganic substrate 10. The hardener/densifier 30 may comprise any material suitable for hardening and/or densifying concrete, any other cementitious substrate, stone or any other inorganic substrate 10.

Without limitation, the hardener/densifier 30 may comprise colloidal silica. Various embodiments of hardener/densifiers that comprise, consist essentially of and consist of colloidal silica are disclosed in U.S. Pat. No. 8,852,334, the entire disclosure of which is hereby incorporated herein. Such a hardener/densifier 30 may comprise an aqueous solution with silica (i.e., silicon dioxide, or $SiO_2$) particles making up about 2% to about 30% (or, more specifically, about 4% to about 7%) of the weight of the aqueous solution. In some embodiments, the silica particles may be coated with a stabilizer, such as a metal or a metal-containing material (e.g., aluminum; an aluminum-containing material, such as alumina (i.e., aluminum oxide, or $Al_2O_3$); etc.), which enables the silica particles to remain in solution at relative low pH (e.g., 10 or less, 8.5 or less, 8 or less, 7 or less, about 3 to about 8, about 4 to about 7, about 3 to about 5, etc.). The hardener/densifier available from Global Polishing Systems, LLC of Henderson, Nev. as CDH-100 is a specific example of a colloidal silica hardener/densifier that may be used in accordance with this disclosure.

Other suitable hardeners/densifiers 30 include compositions comprising alkali metal silicates, such as lithium polysilicates (e.g., the hardener/densifier available from Convergent Concrete Technologies, LLC of Orem, Utah as PENTRA-SIL® (HD) hardener/densifier; the densifier available from Dayton Superior Corporation of Miamisburg, Ohio as PENTRA-HARD® densifier; etc.), potassium silicates and/or sodium silicates.

In some embodiments a hardener/densifier 30 may include a combination of alkali metal silicates or a combination of one or more alkali metal siliconates and colloidal silica.

A silica fume, which is also known as "microsilica," may be included in hardener/densifier 30, such as a hardener/densifier 30 that includes colloidal silica or in a hardener/densifier 30 that includes one or more alkali metal silicates. Silica fume increases the density of the material to which it is applied and reduces alkalinity, which mechanically enhances the material and the inorganic substrate 10, or structure, formed from the material (e.g., by imparting the material and the inorganic substrate 10 with additional strength and stability, etc.), even while mechanically modifying the inorganic substrate 10 (e.g., by cutting, grinding, etc.). Silica fume may also further reduce the presence of microcompressibles at newly exposed surfaces that are formed on (or in) the inorganic substrate 10, which may provide for increased bond strength for materials that are subsequently applied to these newly exposed surfaces (e.g., as described in reference to FIG. 2, as described in reference to FIG. 3, etc.).

The hardener/densifier 30 may be part of an aqueous solution, the essential element, or ingredient, of an aqueous solution or the only ingredient of an aqueous solution that is configured for application to the saw blade 20, the cut or joint 15 and/or the material 14 that has been removed from the inorganic substrate 10.

Alternatively, the hardener/densifier 30 may comprise part of a chemical compound that includes at least one additional active ingredient or the hardener/densifier 30 may be applied concurrently with another chemical that includes one or more additional active ingredients. Some non-limiting examples of additional ingredients include anti-scaling compounds (e.g., metal siliconates, such as potassium methyl siliconate, sodium methyl siliconate; etc.) and other water-repellant materials, sealants (e.g., silanes, siloxanes, combinations thereof, etc.) and other coatings. Some specific, but non-limiting, examples of chemical compositions that include a hardener/densifier 30 and an additional compound (e.g., an anti-scaling compound, etc.) are the chemical compositions available from Convergent Concrete Technologies, LLC, of Orem, Utah under the trademarks PENTRA SHIELD® and TRANSIL®.

The hardener/densifier 30 will react with free calcium hydroxide (lime), a byproduct of cement hydration, which is present at the surfaces 16 and 18 that have been formed by cutting into the inorganic substrate 10, and on the material 14 that has been removed from the inorganic substrate 10. The result of the reaction between the hardener/densifier 30 and the lime of the material 14 and at the surfaces 16 and 18 is calcium silicate hydrate (C—S—H) gel. The C—S—H gel provides a durable paste that will reduce the likelihood of removing the material 14 on the surfaces 16 and 18 and/or present within pores, microfissures, cracks or other features that open or extend into one or both of the surfaces 16 and 18, along with reducing the likelihood that that material 14 will diminish the ability of other substances to adhere to the surface 16 and 18. In addition, the C—S—H gel will reduce the porosity of (i.e., densify) the surfaces 16 and 18 and increase the hardness and abrasion-resistance of the surfaces 16 and 18 to which the hardener/densifier 30 is applied.

In addition, direct or indirect application of the hardener/densifier 30 to the saw blade 20 during use of the saw blade 20 to cut into or otherwise remove material 14 from the inorganic substrate 10 may lubricate the saw blade 20, which may prevent vibration of the saw blade 20, which, in turn, may provide for better control over the saw blade 20 and straighter cuts or joints 15 than occur when conventional cutting processes are used (e.g., without a lubricant, using water as a lubricant, etc.), and reduce or eliminate edge curling, chipping and cracking, as well as the creation of microfissures and the dislodgement of aggregate along the cut or joint 15 that has been formed in the inorganic substrate 10. Use of the hardener/densifier 30 may also prevent material 14 that has been removed from the inorganic substrate 10 from adhering to the saw blade 20 and/or carry material 14 that has been removed from the inorganic substrate 10 away from the saw blade 20. In addition, the hardener/densifier may reduce an operating temperature of the saw blade 20, which may increase its useful life.

In some embodiments, a saw 22 and a saw blade 20 may be used to form a relief cut in an inorganic substrate 10 that comprises a new cementitious material (e.g., new concrete; partially cured concrete, which may be less than 28 days old; etc.), with the application of a hardener/densifier 30 to the saw blade 20, to the inorganic substrate 10 and/or to the material 14 removed from the inorganic substrate 10. Once the material of the inorganic substrate 10 has cured, it may be re-cut or cut further. Such cutting may also be effected with hardener/densifier 30.

In other embodiments, the disclosed technique may be used to form a finished cut in an inorganic substrate 10 that comprises new concrete or another new cementitious material.

When the disclosed methods are used to cut new structures (e.g., slabs, etc.) that comprise inorganic substrates 10 that have been formed from a cementitious material (e.g., concrete, etc., that has not fully cured), the densification and hardening that results from using the hardener/densifier 30 may prevent water loss through the newly defined surfaces 16 and 18, which may enable moisture to be retained in the newly formed structure, and may enable the cementitious material (e.g., concrete, etc.) of the structure to cure more evenly, or uniformly. Some of the potential benefits of enhancing the manner in which the cementitious materials of new structures cure when they are cut in accordance with teachings if this disclosure include reduced porosity at the cut or joint 15, as well as reduced migration of salts (and efflorescence) during hydration (i.e., during the first few days after the structure has been formed), both of which may improve the ability of other materials (e.g., coatings, sealants, seals, etc.) to adhere to the surfaces 16 and 18 of the cut or joint 15.

Of course, the disclosed methods are also useful for cutting into inorganic substrates 10 that have completely cured (e.g., concrete, other cementitious substrates, etc.) or that comprise stone or a similar material.

Figure 2:
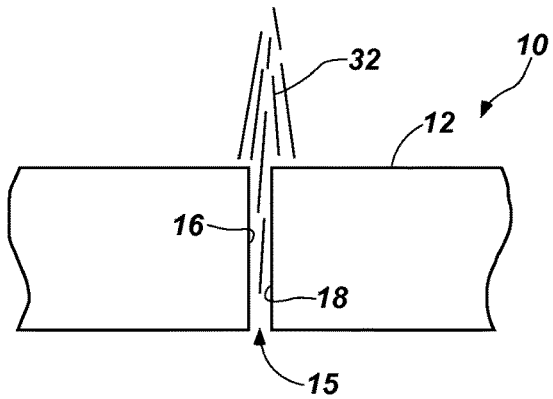
FIG. 2 shows the application of a chemical to surfaces that have been formed in the inorganic substrate of FIG. 1.

Optionally, with the cut or joint 15 formed, as illustrated by FIG. 2, one or more additional chemical compositions 32 may be applied to the surfaces 16 and 18 that define the cut or joint 15, as well as to at least portions of the surface 12 within which the cut or joint 15 was formed (e.g., portions of the surface 12 that are located adjacent to the cut or joint 15, etc.) and, optionally, to one or more other surfaces 12 of the inorganic substrate. The additional chemical composition(s) 32 may comprise an anti-scaling compound (e.g., a metal siliconate, such as potassium methyl siliconate, sodium methyl siliconate; etc.) another water-repellant material, a sealant (e.g., a silane (e.g., in an aqueous solution, in a solvent, etc.); a siloxane; a combination thereof; etc.), another coating or any other material that will provide the cut or joint 15 and the surface 12 of the inorganic substrate 10 with a desired finish (e.g., a color; a graffiti-resistant coating, such as that disclosed by U.S. Pat. No. 7,737,195 of Gimvang, an abrasion-resistant coating, such as that disclosed by U.S. Patent Application Publication 2009/0110834 of Gimvang; etc.).

Figure 3:
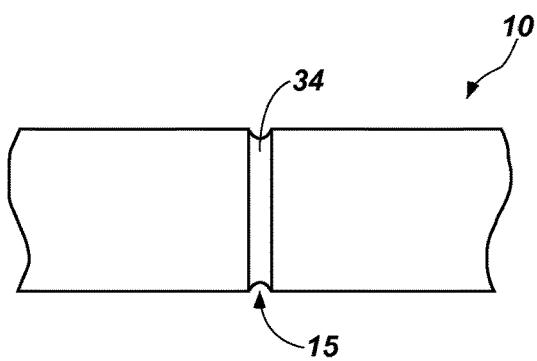
FIG. 3 shows the introduction of a seal into the cut defined in the inorganic substrate of FIG. 1.

As another option, which may be employed in conjunction with or separately from the method disclosed in reference to FIG. 2, and as shown in FIG. 3, one or more elements 34 to be used in conjunction with the inorganic substrate 10 may be introduced into the cut or joint 15, for example, to form a seal 34 in the cut or joint 15. As a non-limiting example, a seal 34 may be introduced into the cut or joint 15. The introduction of a seal 34 into the cut or joint 15 may comprise introducing a suitable seal-forming material (e.g., DOW CORNING® 888 silicone joint sealant or DOW CORNING® 890 silicone joint sealant, both of which are available from Dow Corning Corporation of Midland, Mich.; etc.) into the cut or joint 15. In embodiments where an additional chemical composition 32 comprising silane (e.g., silane in an aqueous solution, a solvent-based silane, etc.) was applied to the surfaces 16 and 18 that define the cut or joint 15, as disclosed in reference to FIG. 2, the silane may ensure that a silicone seal 34 formed in the cut or joint 15 is securely adhered, or interlocked, within the cut or joint 15.

As an alternative to the formation of a seal 34 within a cut or joint 15, a preformed seal 34 may be inserted into the cut or joint 15. In either event, the seal 34 may be securely adhered to the surfaces 16 and 18 that define the cut or joint 15, particularly since the hardener/densifier 30 may have eliminated the presence of microcompressibles or other free particles of the material 14 of the inorganic substrate 10 from the surfaces 16 and 18 and any pores, microfissures, cracks or other features that open or extend into one or both of the surfaces 16 and 18.

The disclosed techniques may be useful in forming or refurbishing joints between structures in transportation surfaces (e.g., sections of pavement, parking decks, bridge structures, combinations thereof, etc.), as disclosed by U.S. patent application Ser. No. 14/597,192, titled PAVEMENT JOINTS AND METHODS FOR TREATING THE SAME, filed on Jan. 14, 2015, the entire disclosure of which is hereby incorporated by reference.

Figure 4:
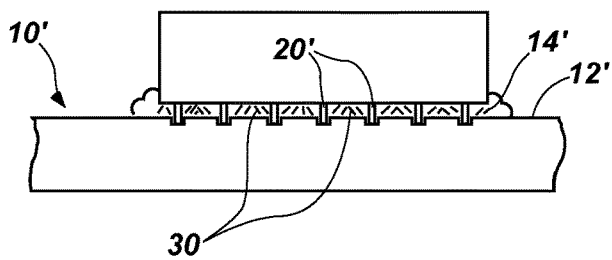
FIG. 4 illustrates an embodiment of a method for grinding a surface of an inorganic substrate to remove material therefrom.
Figure 5:
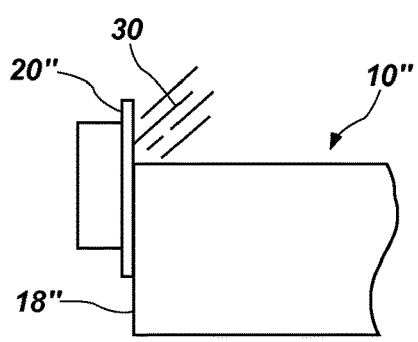
FIG. 5 depicts another embodiment of a method for grinding a surface of an inorganic substrate to remove material therefrom.

In addition, the disclosed techniques may be useful when other types of mechanical modifications are made to an inorganic substrate. As depicted by FIG. 4, a hardener/densifier 30 may be used during a diamond grinding process. More specifically, a hardener/densifier 30 may be applied to a surface 12' of an inorganic substrate 10' while diamond grinding the surface 12', to material 14' removed from the inorganic substrate 10 (e.g., dust, microcompressibles, etc.) and/or to the diamond grinding elements 20'. Likewise, FIG. 5 illustrates an embodiment of a process in which a hardener/densifier 30 is applied in conjunction with use of a grinding disk 20" to mechanically modify a surface 18" of an inorganic substrate 10".

Although the foregoing disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. A method for modifying an inorganic substrate, comprising:

cutting material of an inorganic substrate from the inorganic substrate with a saw blade to provide a newly formed surface; and lubricating the saw blade with a lubricant comprising silica fume, a surfactant, and water while cutting the material of the inorganic substrate from the inorganic substrate with the saw blade.

2. The method of claim 1, further comprising:

enabling the silica fume to react with the newly formed surface.

3. The method of claim 2, wherein enabling the silica fume to react with material of the inorganic substrate at the newly formed surface comprises hardening and densifying the newly formed surface.

4. The method of claim 3, wherein cutting material of the inorganic substrate comprises pushing material of the inorganic substrate cut from the inorganic substrate into pores, microfissures, cracks or other recesses in the newly formed surface.

5. The method of claim 4, wherein enabling the silica fume to react with the material of the inorganic substrate at the newly formed surface further includes enabling the silica fume to react with the material of the inorganic substrate cut from the inorganic substrate.

6. The method of claim 1, wherein lubricating comprises lubricating the saw blade with the lubricant further comprising colloidal silica coated with a stabilizer that enables the silica particles to remain in solution at a pH of about 8.5 or less onto the saw blade.

7. A system for modifying an inorganic substrate, comprising:

a saw blade that cuts material of an inorganic substrate from the inorganic substrate; and a lubricant formulated to lubricate the saw blade during use of the saw blade and to harden and/or densify surfaces formed by the saw blade, the lubricant comprising silica fume, a surfactant, and water.

8. The system of claim 7, wherein the lubricant further comprises colloidal silica is-coated with a stabilizer that enables silica particles of the colloidal silica to remain in solution at a pH of about 8.5 or less.

9. The system of claim 7, further comprising:

an additional material for application to newly exposed surfaces of an inorganic substrate concurrently with or after application of the lubricant; and/or a seal for placement against a newly exposed surface of the inorganic substrate upon removing material of the inorganic substrate from the inorganic substrate with the saw blade.

10. A method for modifying an inorganic substrate, comprising:

cutting material of an inorganic substrate from the inorganic substrate with a saw blade to provide a newly formed surface; and lubricating the saw blade with a lubricant consisting of a hardener/densifier and silica fume while cutting the material of the inorganic substrate from the inorganic substrate with the saw blade.

11. The method of claim 10, wherein lubricating the saw blade comprises lubricating the saw blade with the hardener/densifier of the lubricant being a colloidal silica-based hardener/densifier.

* * * * *